United States Patent
Hara et al.

(10) Patent No.: US 7,692,698 B2
(45) Date of Patent: Apr. 6, 2010

(54) SIGNAL PROCESSING APPARATUS AND SIGNAL PROCESSING METHOD FOR SOLID-STATE IMAGE PICKUP ELEMENT AND IMAGE PICKUP APPARATUS

(75) Inventors: Manabu Hara, Kanagawa (JP);
Hiromasa Ikeyama, Tokyo (JP);
Kazushige Takahashi, Kanagawa (JP);
Yoshiaki Nishide, Kanagawa (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 11/254,053

(22) Filed: Oct. 20, 2005

(65) Prior Publication Data
US 2006/0092288 A1    May 4, 2006

(30) Foreign Application Priority Data
Nov. 2, 2004    (JP) .............................. 2004-319557

(51) Int. Cl.
*H04N 5/217* (2006.01)
*H04N 5/235* (2006.01)

(52) U.S. Cl. .................................. 348/241; 348/222.1

(58) Field of Classification Search ................ 348/242, 348/243, 244, 247, 248
See application file for complete search history.

(56) References Cited

U.S. PATENT DOCUMENTS 5,929,936 A * 7/1999 Arai et al. .................... 348/607
6,476,864 B1 * 11/2002 Borg et al. .................. 348/245
6,654,054 B1 * 11/2003 Embler ........................ 348/241
6,903,670 B1 * 6/2005 Lee et al. ..................... 341/118
7,304,670 B1 * 12/2007 Hussey et al. ............... 348/241

FOREIGN PATENT DOCUMENTS

| JP | 3-85972 | 4/1991 |
| JP | 7-67038 | 3/1995 |
| JP | 10-313428 | 11/1998 |
| JP | 2002-125155 | 4/2002 |
| JP | 2003-18475 | 1/2003 |

OTHER PUBLICATIONS

U.S. Appl. No. 11/252,710, filed Oct. 19, 2005, Hara et al.

* cited by examiner

*Primary Examiner*—Luong T Nguyen
(74) *Attorney, Agent, or Firm*—Oblon, Spivak, McClelland, Maier & Neustadt, L.L.P.

(57) ABSTRACT

An apparatus includes a solid-state image pickup element that outputs video signals obtained from pixels arranged in a column direction. The apparatus also includes an amendment unit that amends an error value corresponding to a column position of the video signals according to a temperature to supply an amended error value to a subtraction unit that subtracts the amended error value for each column from the video signals. The apparatus further includes an error computing section that shields the pickup element from light or irradiates light to the pickup element at a constant rate, computes a respective average value of each of a plurality of pixel signals obtained from the pixels in a predetermined region of the pickup element, subtracts the respective average value from a respective of the plurality of pixel signals obtained from the pixels of the pickup element, and accumulates values obtained by subtractions for respective columns.

9 Claims, 13 Drawing Sheets

SIGNAL PROCESSING APPARATUS AND SIGNAL PROCESSING METHOD FOR SOLID-STATE IMAGE PICKUP ELEMENT AND IMAGE PICKUP APPARATUS

CROSS REFERENCE TO RELATED APPLCIATIONS

The present invention contains subject matter related to Japanese Patent Application JP 2004-319557 filed in the Japanese Patent Office on Nov. 2, 2004, the entire contents of which being incorporated herein by reference.

BACKGROUND OF THE INVENTION

1. Field of the Invention

This invention relates to a signal processing apparatus and a signal processing method for processing video signals output from a solid-state image pickup element such as C-MOS image sensor and also to an image pickup apparatus formed by using a solid-state image pickup element such as C-MOS image sensor.

2. Description of the Related Art

Image sensors (hereinafter referred to as C-MOS image sensors) prepared by means of C-MOS type semiconductor manufacturing processes have become very popularly in recent years. With a C-MOS image sensor, it is possible to sequentially read out pixel signals from the unit pixels that are arranged typically in the form of a matrix of m columns×n rows. More specifically, m column signal lines, each being adapted to transmit the pixel signals generated from n unit pixels arranged in a vertical direction (which is also referred to as column direction) and n horizontal selection lines, each being adapted to select a unit pixel to be operated from m unit pixels arranged in a horizontal direction, are arranged in the form of a grid so that the unit pixels of n rows×m columns are sequentially raster-scanned on a one by one basis by means of the column signal lines and the horizontal selection lines to generate video signals.

SUMMARY OF THE INVENTION

Among C-MOS image sensors, those having column signal lines that are provided with respective amplifiers (which are also referred to as column amplifiers) are known. Such a C-MOS image sensor is referred to as column amplifier system C-MOS image sensor.

Column amplifier system C-MOS image sensors can give rise to images showing vertical stripes due to errors of the amplification ratios of some of the column amplifiers. Such stripes are constantly produced with a fixed pattern regardless of an object of shooting to degrade the image quality. Such stripes are referred to as vertical stripe noise.

As a matter of course, it is desirable to reduce such vertical stripe noises. A technique for eliminating vertical stripe noises is described in Patent Document 1 (Jpn. Pat. Appln. Laid-Open Publication No. 2002-125155). The technique described in Patent Document 1 is devised to detect video signals obtained by picking up an image in the dark, store the detected video signals in a line buffer as noise component and subtract the noise component from the video signals obtained by shooting an object in the light.

However, the technique described in Patent Document 1 cannot completely eliminate vertical stripe noises because of variances in terms of variances of temperature and the operational linearity of the column amplifiers.

Therefore, it is desirable to dissolve this problem.

According to the present invention, there is provided a signal processing apparatus to be used for a solid-state image pickup element having in the inside thereof a plurality of output systems for outputting video signals obtained from pixels arranged in the column direction, the apparatus including: an amendment means for amending an error value of each column in the video signals output from the solid-state image pickup element; a temperature detection means for detecting temperature; a subtraction means for subtracting the error value amended by the amendment means for each column from the video signals output from the solid-state image pickup element; and an error value computing means for computing the error value of each column by conducting a process of shielding the solid-state image pickup element from light or irradiating light to the solid-state image pickup element at a constant rate, computing an average value of the pixel signals obtained from the pixels in a predetermined region of the solid-state image pickup element, subtracting the average value from the pixel signal obtained from each pixel of the solid-state image pickup element and accumulating the values obtained by the subtractions for respective columns in advance of an image pickup operation; the amendment means being adapted to amending the error value corresponding to the column position of the video signal output from the solid-state image pickup element according to the temperature detected by the temperature detection means; supplying the amended error value to the subtraction means.

According to the present invention, there is provided a signal processing method of processing video signals output from a solid-state image pickup element having in the inside thereof a plurality of output systems for outputting video signals obtained from pixels arranged in the column direction, the method including the steps of: shielding the solid-state image pickup element from light or irradiating light to the solid-state image pickup element at a constant rate; computing the average value of the pixel signals obtained from the pixels in a predetermined region of the solid-state image pickup element; subtracting the average value from the pixel signal obtained from each pixel of the solid-state image pickup element; accumulating the values obtained by the subtractions for respective columns; and reserving the accumulated values as error values of the respective columns, in advance of an image pickup operation using the solid-state image pickup element, the method further including the steps of: detecting the temperature; amending the error value corresponding to the column position of the video signal output from the solid-state image pickup element according to the detected temperature; and subtracting the amended error value from the video signal output from the solid-state image pickup element, at the time of an image pickup operation using the solid-state image pickup element.

According to the present invention, there is provided an image pickup apparatus including: a solid-state image pickup element having in the inside thereof a plurality of output systems for outputting video signals obtained from pixels arranged in the column direction; a temperature detection means for detecting temperature; an amendment means for amending an error value of each column in the video signals output from the solid-state image pickup element; a subtraction means for subtracting the error value amended by the amendment means for each column from the video signals output from the solid-state image pickup element; a recording or display means for recording on a recording medium or displaying on a display apparatus the video signals obtained by subtracting the error value by the subtracting means; and an error value computing section for computing the error value of each column by conducting a process of shielding the solid-state image pickup element from light or irradiating light to the solid-state image pickup element at a constant rate, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for respective columns in advance of an image pickup operation, the amendment means being adapted to amending the error value corresponding to the column position of the video signal output from the solid-state image pickup element according to the temperature detected by the temperature detection means; and supplying the amended error value to the subtraction means.

According to the present invention, there is provided a signal processing apparatus of a solid-state image pickup element having in the inside thereof a plurality of output systems for outputting video signals obtained from pixels arranged in the column direction, the apparatus including: an amendment means for generating an error value on the basis of the error value for each column of the video signal output from the solid-state image pickup element at the time of light-shielding (light-shielding time error value) and the error value for each column of the video signal output from the solid-state image pickup element at the time of irradiating light at a rate (constant rate) arbitrarily selected as reference (reference level error value); a subtraction means for subtracting the error value generated by the amendment means for each column from the video signals output from the solid-state image pickup element; and an error value computing section for computing the light-shielding time error value for each column by conducting prior to an image pickup operation a process of shielding the solid-state image pickup element from light, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for respective columns; and also computing the reference level error value for each column by conducting prior to an image pickup operation a process of irradiating the solid-state image pickup element at a constant rate, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for each column; the amendment means being adapted to generating an error value by synthesizing the light-shielding time error value and the reference level error value corresponding to the column position of the video signal output from the solid-state image pickup element; and supplying the generated error value to the subtraction means.

According to the present invention, there is provided a solid-state image pickup element having in the inside thereof a plurality of output systems for outputting video signals obtained from pixels arranged in the column direction; an amendment means for generating an error value on the basis of the error value for each column of the video signal output from the solid-state image pickup element at the time of light-shielding (light-shielding time error value) and the error value for each column of the video signal output from the solid-state image pickup element at the time of irradiating light at a rate (constant rate) arbitrarily selected as reference (reference level error value); a subtraction means for subtracting the error value generated by the amendment means for each column from the video signals output from the solid-state image pickup element; a recording or display means for recording on a recording medium or displaying on a display apparatus the video signals obtained by subtracting the error value by the subtracting means; and an error value computing section for computing the light-shielding time error value for each column by conducting prior to an image pickup operation a process of shielding the solid-state image pickup element from light, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for respective columns; and also computing the reference level error value for each column by conducting prior to an image pickup operation a process of irradiating the solid-state image pickup element at a constant rate, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for each column; the amendment means being adapted to generating an error value by synthesizing the light-shielding time error value and the reference level error value corresponding to the column position of the video signal output from the solid-state image pickup element; and supplying the generated error value to the subtraction means.

According to the present invention, there is provided an image pickup apparatus including: a solid-state image pickup element having in the inside thereof a plurality of output systems for outputting video signals obtained from pixels arranged in the column direction; an amendment means for generating an error value on the basis of the error value for each column of the video signal output from the solid-state image pickup element at the time of light-shielding (light-shielding time error value) and the error value for each column of the video signal output from the solid-state image pickup element at the time of irradiating light at a rate (constant rate) arbitrarily selected as reference (reference level error value); a subtraction means for subtracting the error value generated by the amendment means for each column from the video signals output from the solid-state image pickup element; a recording or display means for recording on a recording medium or displaying on a display apparatus the video signals obtained by subtracting the error value by the subtracting means; and an error value computing section for computing the light-shielding time error value for each column by conducting prior to an image pickup operation a process of shielding the solid-state image pickup element from light, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for respective columns; and also computing the reference level error value for each column by conducting prior to an image pickup operation a process of irradiating the solid-state image pickup element at a constant rate, computing the average value of the pixel signals obtained from the pixels in a predetermined region of the solid-state image pickup element, subtracting the average value from the pixel signal obtained from each pixel of the solid-state image pickup element and accumulating the values obtained by the subtractions for each column; the amendment means being adapted to generating an error value by synthesizing the light-shielding time error value and the reference level error value corresponding to the column position of the video signal output from the solid-state image pickup element; and supplying the generated error value to the subtraction means.

Thus, the present invention provides a signal processing method of a solid-state image pickup element having in the inside thereof a plurality of output systems for outputting the video signals obtained from the pixels arranged in the column direction and an image pickup apparatus including such a solid-state image pickup element. According to the invention, video signals are obtained from the solid-state image pickup element by shielding the solid-state image pickup element from light or irradiating light to the solid-state image pickup element at a constant rate and the black level or an arbitrarily selected reference level is subtracted from the video signals to determine the error value of each column. Then, at the time of an image pickup operation, a value determined on the basis of the error value is subtracted from the video signals to eliminate the stripe noises attributable to the column amplifiers of the solid-state image pickup element.

Additionally, according to the present invention, the above described error value is amended according to the temperature and the amended error value is subtracted from the video signals to eliminate the stripe noises attributable to the column amplifiers of the solid-state image pickup element.

With the above-described arrangement, according to the invention, it is possible to reliably eliminate the stripe noises attributable to the column amplifiers of the solid-state image pickup element if there are variances in terms of the temperature of the column amplifiers.

Additionally, according to the invention, the error value of the solid-state image pickup element at the time of light-shielding (light-shielding time error value) and the error value of the solid-state image pickup element at the time of irradiation at a constant rate (reference level error value) are interpolated to eliminate the stripe noises attributable to the column amplifiers of the image pickup apparatus.

With this arrangement, according to the invention, it is possible to reliably eliminate the stripe noises attributable the column amplifiers of the solid-state image pickup element if there are variances in terms of the operational linearity of the column amplifiers.

DETAILED DESCRIPTION OF THE PREFERRED EMBODIMENTS

Now, the present invention will be described in terms of an electronic video camera (to be referred to simply as video camera hereinafter) realized by applying the present invention.

Figure 1:
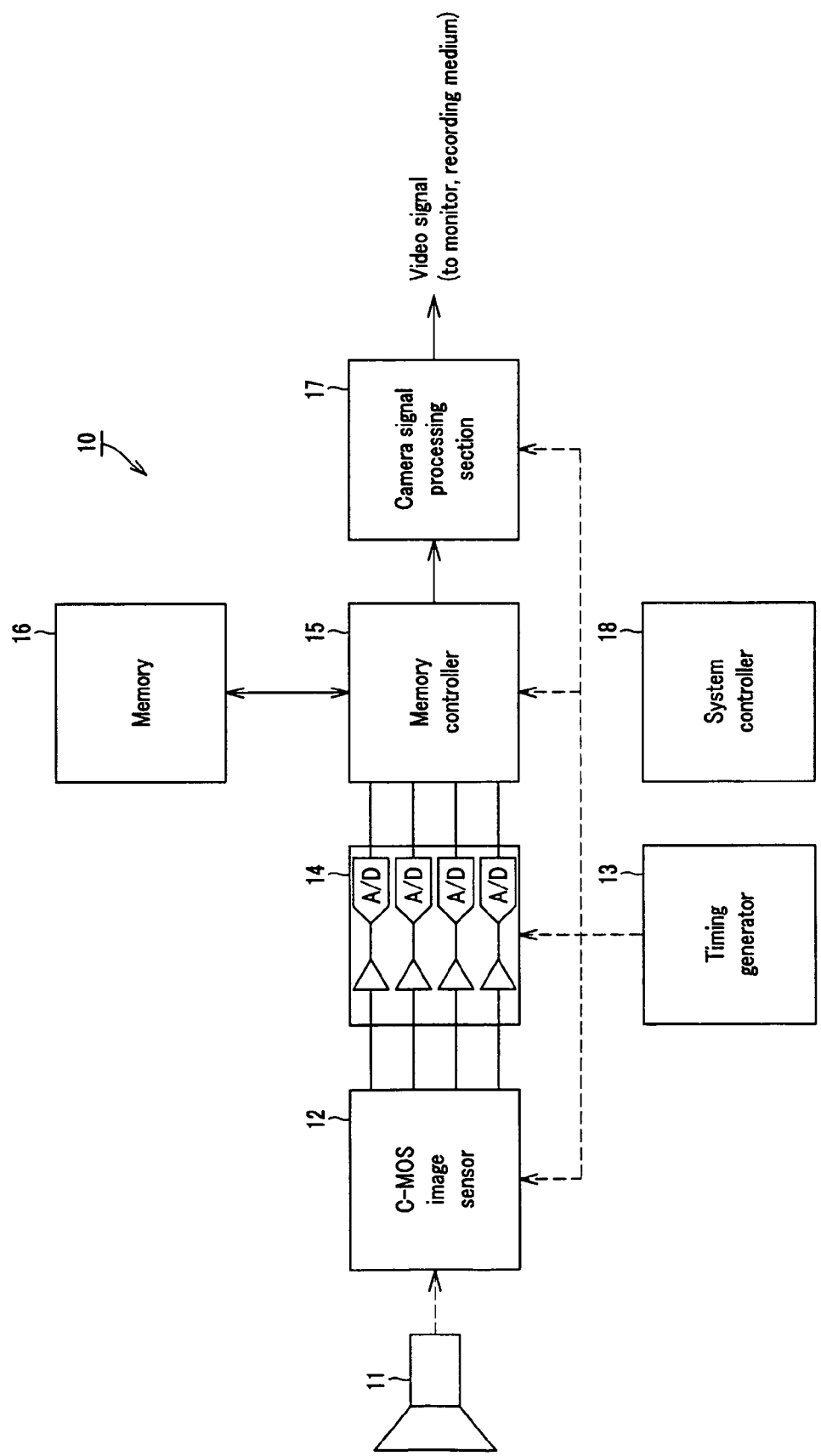
FIG. 1 is a schematic block diagram of a video camera realized by applying the present invention.

FIG. 1 is a schematic block diagram of video camera 10 realized by applying the present invention Referring to FIG. 1, the video camera 10 includes a lens unit 11, a C-MOS (complementary—metal oxide semiconductor) image sensor 12, a timing generator 13, an analog signal processing section 14, a memory controller 15, a memory 16, a camera signal processing section 17 and a system controller 18.

The lens unit 11 includes a focusing lens, a zoom lens and aperture blades as well as a drive section for driving the lenses and so on. The lens unit 11 receives light from a subject and forms an image of the subject on the light receiving plane of the C-MOS image sensor 12.

The C-MOS image sensor 12 has unit pixels that are arranged to form a matrix on the light receiving plane thereof. Each of the unit pixels is adapted to operate for photoelectric conversion. The C-MOS image sensor 12 outputs video signals by scanning the unit pixels arranged to form a matrix and reading out electric signals. The C-MOS image sensor 12 is of the column amplifier system and adapted to output the video signals of four column lines in parallel.

The video signals read out by the C-MOS image sensor 12 are supplied to the analog signal processing section 14.

The timing generator 13 generates timings for reading out signals and various synchronizing signals including vertical synchronizing signals and supplies them to related circuits.

The analog signal processing section 14 conducts analog processes including a sampling process and an amplifying process for each set of output signals of the four column lines output from the C-MOS image sensor 12 and also conducts an A/D conversion process for each set of output signals of the four column lines for digitization. The digitized video signals are read out by the memory controller 14 and stored once in the memory 16.

The memory controller 14 reads out the video signals that are stored once in the memory 16 on the basis of a pixel column by pixel column basis in the ordinary order of pixels and supplies them to the camera signal processing section 17.

The camera signal processing section 17 conducts adjustment operations such as gamman amendment and white balance control with respect to the input video signals. Additionally, the camera signal processing section 17 conducts a process of eliminating vertical stripe noises with respect to the input video signals. The camera signal processing section 17 converts the video signals into video signals of the format required by the NTSC system or the recording media after carrying out the signal processing operations.

The configuration and the processing operation of the vertical stripe noise elimination processing section will be described in greater detail hereinafter.

The system controller 18 controls the components of the video camera 10.

The video camera 10 having the above-described configuration can pick up an image of the subject and output the signals of the picked up image as video signals. The output video signals are typically recorded on a hard disc or an optical disc or displayed on the finder of the LCD monitor of the video camera.

Now, the configuration of the C-MOS image sensor 12 will be described below.

Figure 2:
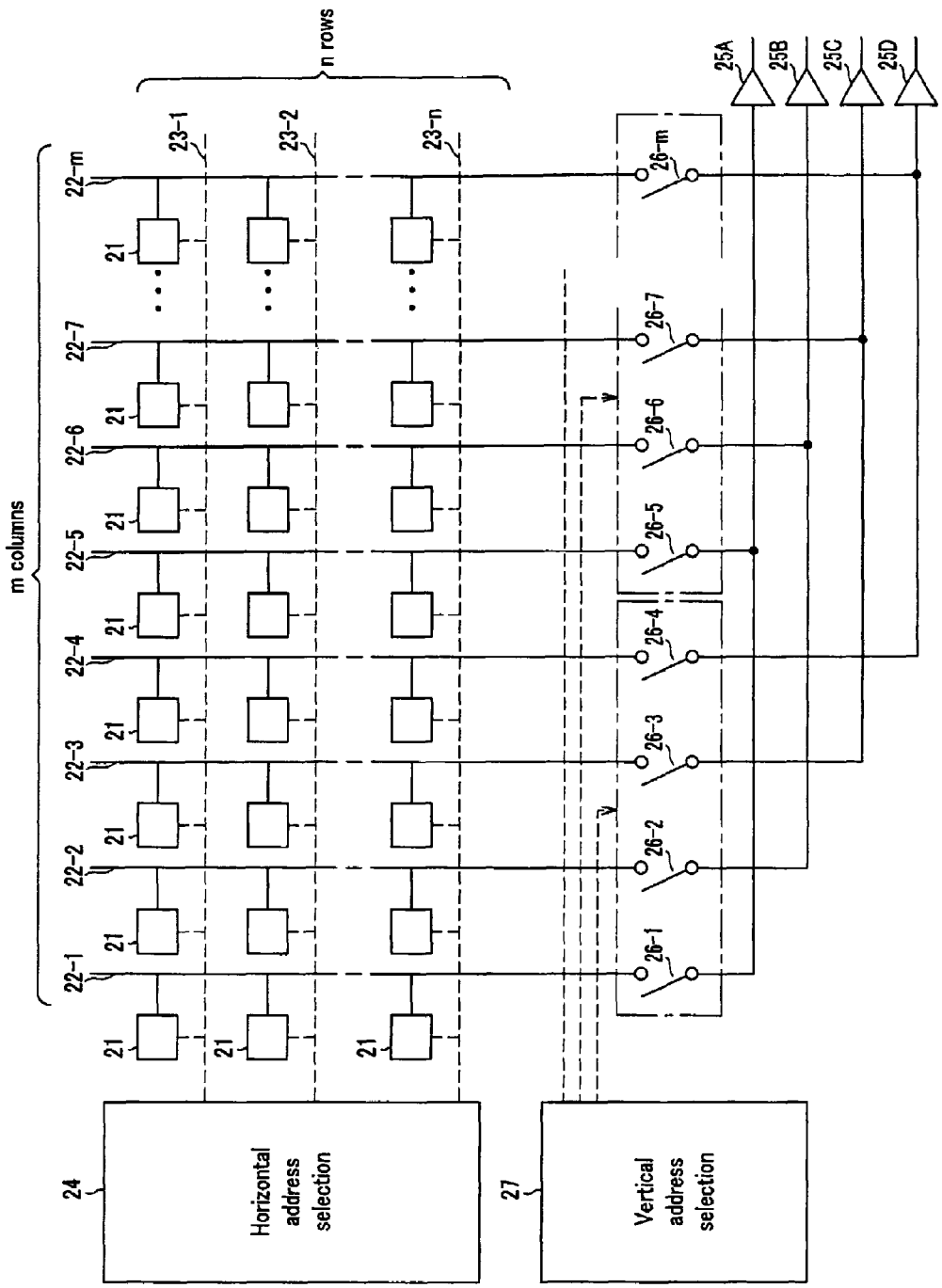
FIG. 2 is a schematic illustration of a C-MOS image sensor.

FIG. 2 is a schematic illustration of the C-MOS image sensor 12, which is a column amplifier system C-MOS image sensor.

The C-MOS image sensor 12 includes a plurality of unit pixels 21 that are arranged in the form of a matrix of m columns and n rows and m column signal lines 22 (22-1, 22-2, ..., 22-m) for transmitting the electric signals output from the unit pixels 21. The C-MOS image sensor 12 additionally includes n horizontal selection lines 23 (23-1, 23-2, ..., 23-n), each of which is connected to a group of m unit pixels arranged in the horizontal direction, and a horizontal address selection circuit 24 for supplying a selection signal to the n horizontal selection lines 23.

Figure 3:
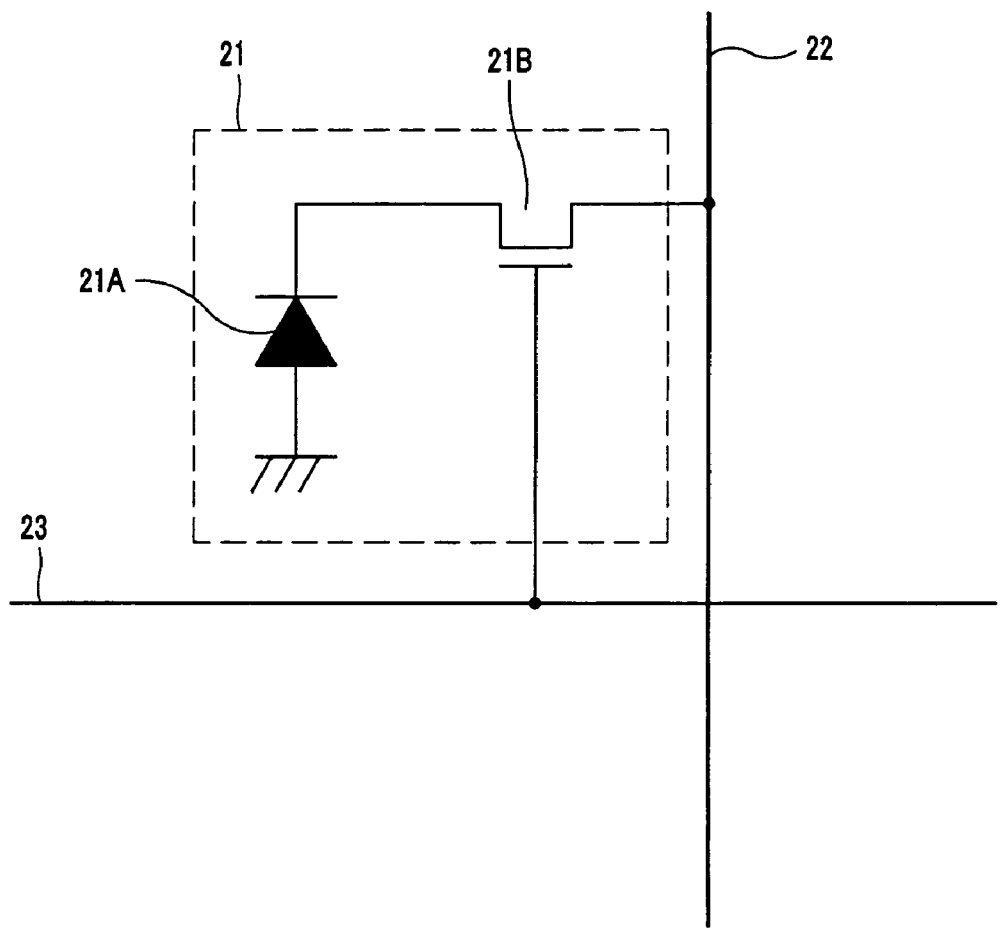
FIG. 3 is a schematic illustration of the configuration of a unit pixel in the C-MOS image sensor.

As shown in FIG. 3, each of the unit pixels 21 has at least a photodetector 21A and a C-MOS switch 23B. The photodetector 21A receives irradiated light and conducts an operation of photoelectric conversion to generate an electric signal that corresponds to the quantity of light it receives. The horizontal selection line 23 that extends from the horizontal address selection circuit 24 is connected to the gate of the C-MOS switch 21B. The C-MOS switch 21B is controlled so as to be turned on and off by the selection signals supplied from the horizontal address selection circuit 24 by way of the horizontal selection line 23. The n unit pixels 21 of each group that are arranged in the vertical direction are connected to a corresponding one of the column signal lines 22.

Thus, the unit pixel 21 generates an electric signal that corresponds to the quantity of light that the photodetector 21A receives in an image pickup operation. As the C-MOS switch 21B of the unit pixel 21 is turned on by the horizontal address selection circuit 24, the electric signal that the photodetector 21A generates is output to the column signal line 22 connected to it.

The C-MOS image sensor 12 further includes four column amplifiers 25 (including the first column amplifier 25A, the second column amplifier 25B, the third column amplifier 25C and the fourth column amplifier 25D), m column selection switches 26 (26-1, 26-2, ..., 26-m) connected respectively to the corresponding column signal lines 22 and a vertical address selection circuit 27.

The m column signal lines 22 are grouped into four sets, which correspond to the number of column amplifiers 25, and each column signal line 22 is connected to the corresponding one of the column amplifiers 25 by way of a column selection switch 26. More specifically, of the four sets of column signal lines 22, the first set of column signal lines 22 (22-1, 22-5, ..., 22-(n−3)) are connected to the first column amplifier 25A by way of the respective column selection switches 26 and the second set of column signal lines 22 (22-2, 22-6, ... 22-(n−2)) are connected to the second column amplifier 25B by way of the respective column selection switches 26, whereas the third set of column signal lines 22 (22-3, 22-7, ..., 22-(n−1)) are connected to the third column amplifier 25C by way of the respective column selection switches 26 and the fourth set of column signal lines 22 (22-4, 22-8, ... 22-(n)) are connected to the fourth column amplifier 25D by way of the respective column selection switches 26.

The vertical address selection circuit 27 generates column signal selection signals for selectively turning on/off the column selection switches 26. The vertical address selection circuit 27 is adapted to turn on/off each set of four column selection switches 26. As a column selection switch 26 is turned on, the electric signals output from the unit pixels 21 that are connected to a column signal line 22 are amplified by the corresponding camera amplifier 25 and externally output.

When the C-MOS image sensor 12 having the above described configuration is operated to pick up an image, the electric signals generated as a result of the operations of photoelectric conversion of the unit pixel 21 are sequentially scanned by the horizontal address selection circuit 24 and the vertical address selection circuit 27 so as to be output to the outside. At this time, the C-MOS image sensor 12 outputs the electric signals of the four groups of unit pixels 21 that are arranged in the vertical direction (column direction) in parallel simultaneously. Thus, the C-MOS image sensor 12 can reads out signals at an extremely high speed.

While the C-MOS image sensor 12 of this embodiment is adapted to read out the electric signals of four column groups of unit pixels, the present invention is by no means limited to four column groups of unit pixels. A C-MOS image sensor that can be used for the purpose of the present invention may additionally include a plurality of read lines in the inside so that electric signals are multiplexed to a single output signal immediately before they are output from the image pickup element.

Figure 4:
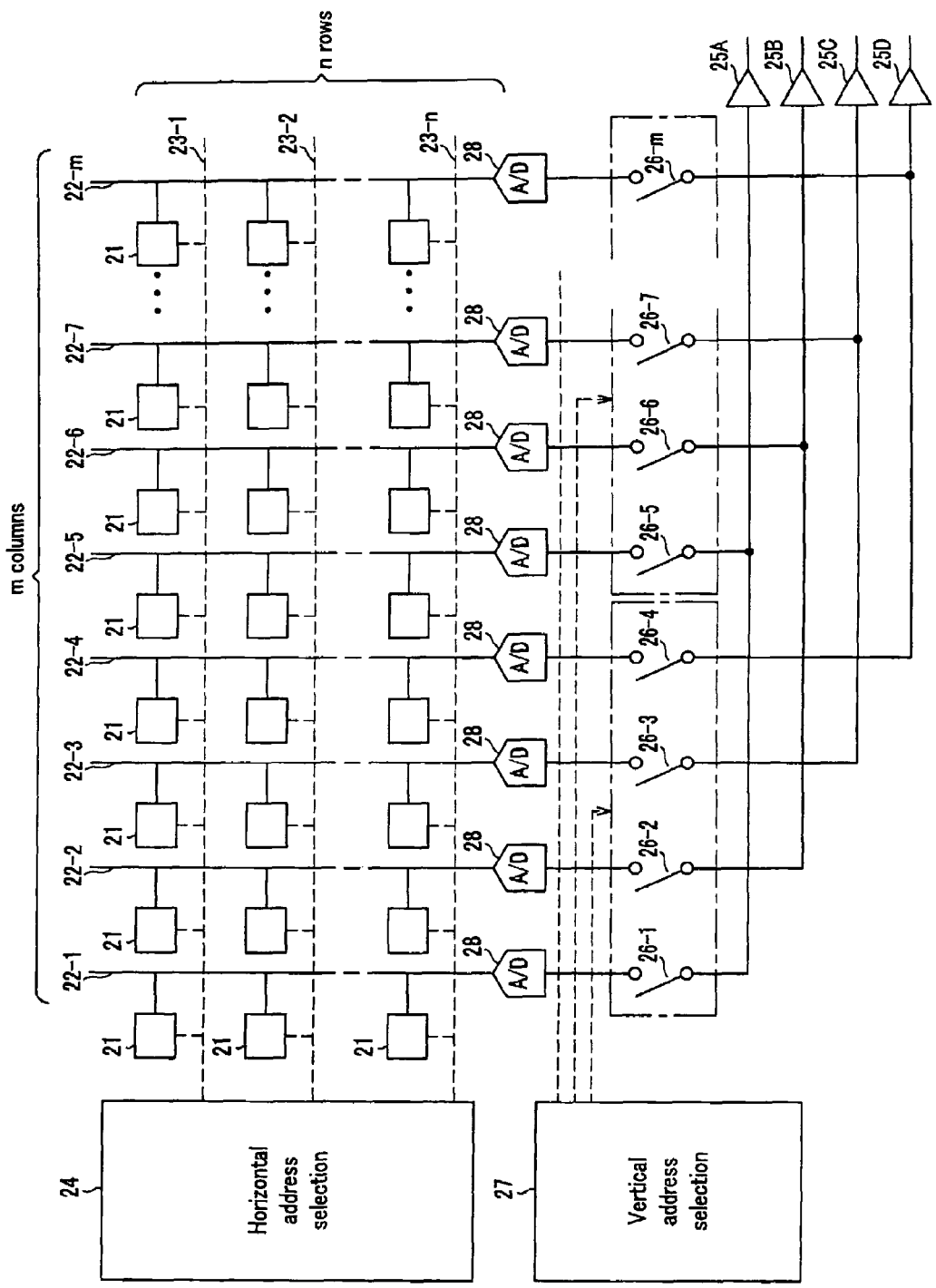
FIG. 4 is a schematic illustration of a C-MOS image sensor of the type containing A/D converters.

Furthermore, a C-MOS image sensor that includes analog/digital (A/D) converters 28 connected to respective column signal lines 22 so as to output digital signals as illustrated in FIG. 4 may alternatively be used for the purpose of the present invention. If such is the case, the downstream analog signal processing section 14 is not necessary.

While a C-MOS image sensor 12 is used as image sensor in this embodiment, it may be replaced by a CCD image sensor or some other image sensor.

Elimination of Vertical Stripe Noises

Now, the vertical stripe noise elimination processing section that is arranged in the camera signal processing section 17 will be described below.

The first through fourth vertical stripe noise elimination processing sections will be described below as specific examples of vertical stripe noise elimination processing section. However, one of the first through fourth vertical stripe noise elimination processing sections may be arranged in the camera signal processing section 17 or, alternatively, all or some of them may be combined and arranged in the camera signal processing section 17.

First Vertical Stripe Noise Elimination Processing Section

Figure 5:
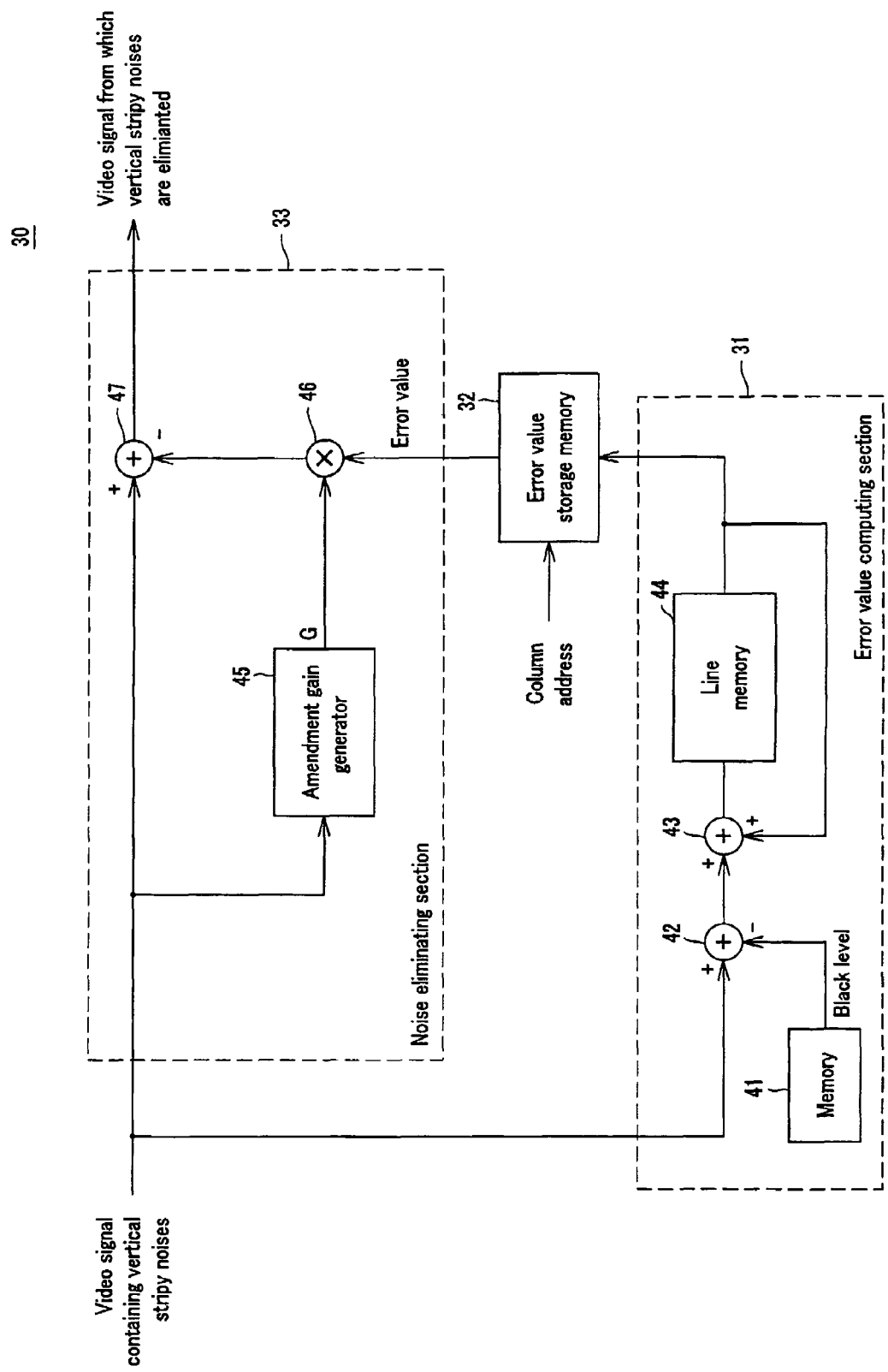
FIG. 5 is a schematic block diagram of a first vertical stripe noise elimination processing section.

FIG. 5 is a schematic block diagram of the first vertical stripe noise elimination processing section 30.

As shown in FIG. 5, the first vertical stripe noise elimination processing section 30 includes an error value computing section 31, an error value storage memory 32 and a noise eliminating section 33.

The error value computing section 31 detects the vertical stripe noises generated due to the variances of the amplification factor and so on among the column amplifiers 25 of the C-MOS image sensor 12 in advance, computes the error value of each column that corresponds to the detected vertical stripe noise component and stores the error value in the error value storage memory 32. The description of detecting the vertical stripe noises generated due to the variances of the amplification factor and so in advance means that they are detected before an image pickup operation. For example, they may be detected at the time of shipment from a manufacturing plant, at the time of supplying power or at the time of a resetting operation. In other words, the error value computing section 31 is a circuit that operates at the time of shipment from the manufacturing plant, at the time of supplying power or at the time of a resetting operation. While the error value computing section 31 is realized by means of hardware that is arranged in the camera signal processing circuit 17 in this embodiment, it may alternatively be so arranged that the system controller 18 conducts a process similar to the above-described one conducted by the error value computing section 31 by means of software.

The error value storage memory 32 is a memory for holding the error values computed by the error value computing section 31, which memory is a non-volatile memory such as flash memory. However, it is not necessary that the error value storage memory 32 is a non-volatile memory when noises are computed at the time of supplying power or in an auto-black mode. The error value storage memory 32 stores error values so as to show correspondences to column addresses. Thus, an error value is read out as the corresponding column address is specified externally.

The noise eliminating section 33 conducts a process of eliminating vertical stripe noises from the video signals obtained as a result of an image pickup operation of the video camera 10 during the image pickup operation, using the error values stored in the error value storage memory 32.

Now, the error value computing section 31 will be described further in greater detail.

As shown in FIG. 5, the error value computing section 31 includes a memory 41 for storing the black levels of video signals, a subtracter 42 for subtracting the black levels stored in the memory 41 respectively from the input video signals, an adder 43 and a line memory 44 for delaying the output of the adder 43 by a horizontal line. The adder 43 adds the output value of the subtracter 42 and the output value of the line memory 44. In other words, the adder 43 and the line memory 44 constitute a cumulative addition circuit that cumulatively adds the differences in the direction of the vertical lines (column lines).

Figure 6:
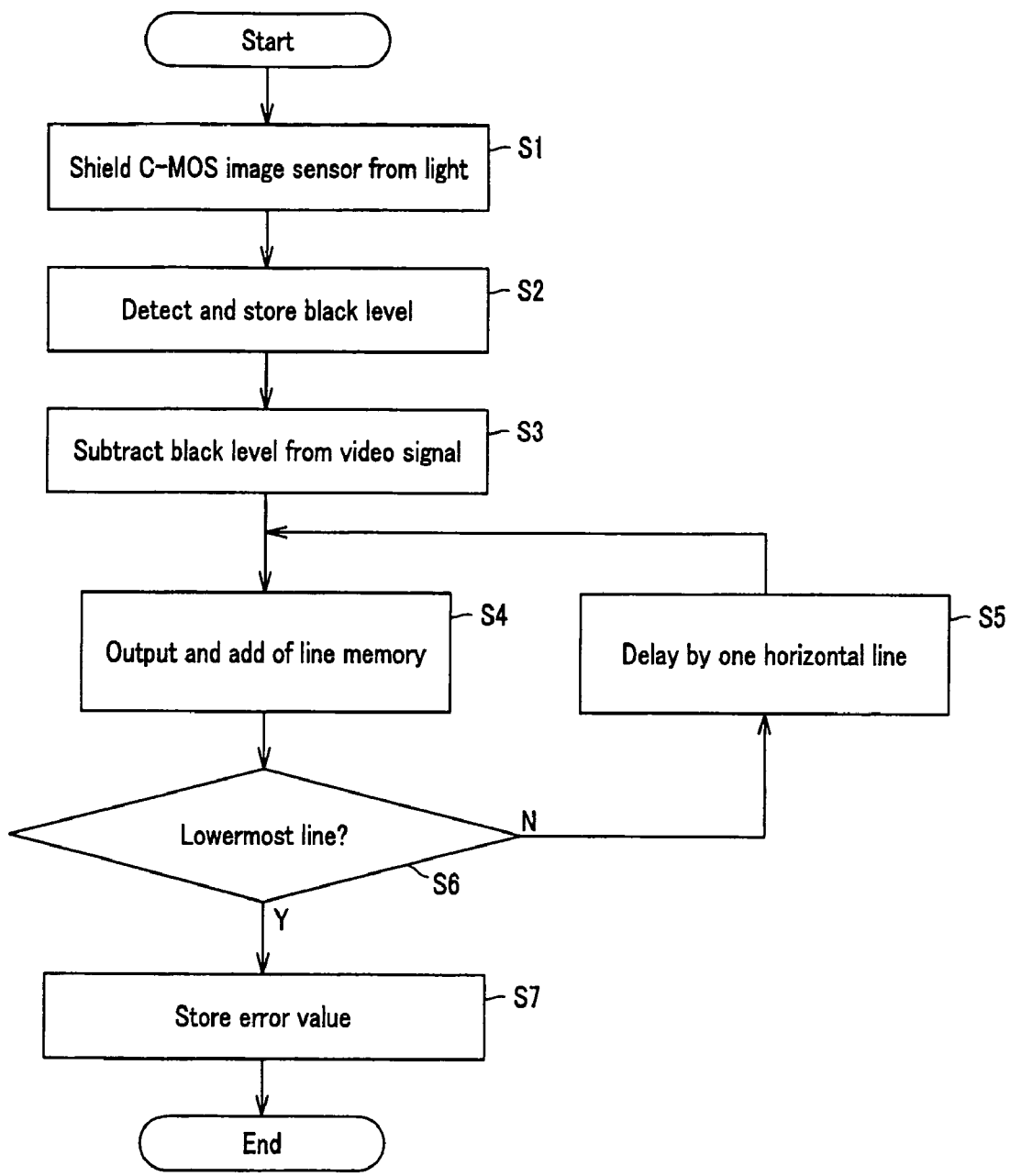
FIG. 6 is a flowchart of the error computing process of the first vertical stripe noise elimination processing section.

The error value computing section 31 having the above-described configuration is controlled by the system controller 18. The system controller 18 conducts an error value computing process with use of the error value computing section 31 as shown by the flowchart in FIG. 6 at the time of shipment from the manufacturing plant, at the time of supplying power or at the time of a resetting operation.

As an error value detecting process is started, the system controller 18 shields the C-MOS image sensor 12 from light irradiating it by controlling the lens unit 11 and other related components (Step S1).

Then, the system controller 18 carries out an image pickup operation in the light-shielding state and stores the video signals obtained from the C-MOS image sensor 12 typically for an image in the memory 16. The system controller 18 computes the average value of the video signals in a predetermined image region out of the video signals for an image stored in the memory 16. It may be imaginable that the obtained average value of the video signals represents the black level (or level 0). Then, the system controller 18 stores the computed value for the black level in the memory 41 (Step S2).

Subsequently, the system controller 18 reads out the video signals of an image picked up in the light-shielding state that are stored in the memory 16 sequentially on a pixel by pixel basis and supplies them to the subtracter 42. The subtracter 42 subtracts the black level stored in the memory 41 from each of the pixel values of the input video signals (Step S3). As a result, the error component contained in each pixel value is output.

Thereafter, the error components output from the subtracter 42 are added to the values output from the line memory 44 and stored once again in the line memory 44 (Step S4). The line memory 44 outputs the input signals, delaying them by a horizontal line (Step S5). The initial value of the line memory 44 is 0.

Thus, the adder 43 and the line memory 44 cumulatively add the error components of the video signals in the vertical direction (column direction).

Then, the system controller 18 determines if the cumulative addition process is conducted to the lowermost line in the image or not (Step S6). When the cumulative addition process is conducted to the lowermost line, the value obtained by adding the values stored in the line memory 44 and dividing the sum by the number of lines represents the error value from the black level for each vertical column. This value represents a vertical stripe noise.

When the system controller 18 determines that the cumulative addition process is conducted to the lowermost line, it stores the error value of each vertical column stored in the line memory 44 in the error value storage memory 32 (Step S7). At this time, each error value is stored at a corresponding column address so that the error value can be read out by specifying the column address.

The error value detection process ends when the processing operation of Step S7 is completed.

Now, the noise eliminating section 33 will be described below.

As shown in FIG. 5, the noise eliminating section 33 has an amendment gain generating section 45 for generating an amendment gain G that corresponds to the level of the input video signal, a multiplier 46 for multiplying the error value read out from the error value storage memory 32 by the amendment gain G and a subtracter 47 for subtracting the error value amended by the multiplier 46 (amended error value) from the video signal input to it.

The noise eliminating section 33 having the above described configuration executes an error elimination process during an ongoing image pickup operation of the video camera 10.

As the video camera 10 is operating to pick up an image, the video signals of the picked up image are input to the noise eliminating section 33. The video signals are input to the subtracter 47 on a pixel by pixel basis.

As the column address of the pixel of a pixel signal input to the subtracter 47 is input to the error value storage memory 32, the error value storage memory 32 outputs the error value that corresponds to the input column address. The error value output from the error value storage memory 32 is then input to the multiplier 46.

The pixel signal input to the subtracter 47 is also input to the amendment gain generating section 45 at the same time. The amendment gain generating section 45 generates an amendment gain G that corresponds to the level of the input pixel signal.

In the noise eliminating section 33, the amendment gain G computed by the amendment gain generating section 45 in the above described manner is supplied to the multiplier 46.

Then, the multiplier 46 multiplies the error value output from the error value storage memory 32 by the amendment gain G and supplies the product of the multiplication to the subtracter 47.

The subtracter 47 then subtracts the error value amended by multiplying the amendment gain G (amended error value) from the input pixel signal.

The video signal from which the vertical stripe noise is eliminated as a result of the above-described process is then output from the subtracter 47.

Figure 7:
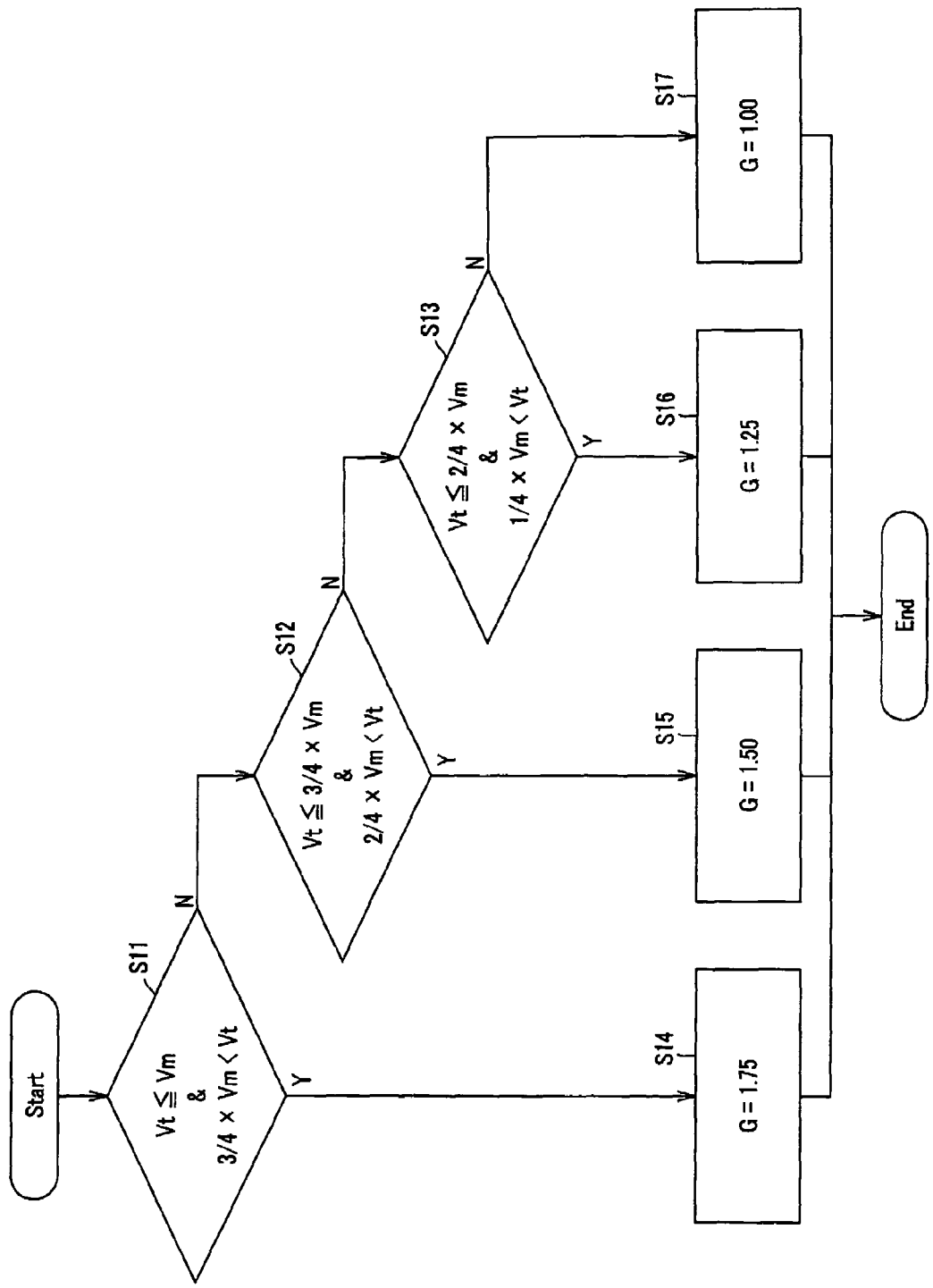
FIG. 7 is a flowchart of the computation of the amendment gain of the first vertical stripe noise elimination processing section.

FIG. 7 is a flowchart of the computation of the amendment gain G of the amendment gain generating section 45.

Referring to FIG. 7, the maximum level of the video signal is Vm and the level of the input pixel signal is Vt, the amendment gain generating section 45 typically computes the amendment gain G in a manner as described below.

If the level Vt of the input pixel signal is Vt and Vt is not higher than Vm and higher than ($3/4 \times Vm$) (Step S11), the amendment gain generating section 45 generates an amendment gain G that is equal to 1.75 (Step S14).

If, on the other hand, the level of the input pixel signal is Vt and Vt is not higher than ($3/4 \times Vm$) and higher than ($2/4 \times Vm$) (Step S12), the amendment gain generating section 45 generates an amendment gain G that is equal to 1.50 (Step S15).

If the level of the input pixel signal is Vt and Vt is not higher than ($2/4 \times Vm$) and higher than ($1/4 \times Vm$) (Step S13), the amendment gain generating section 45 generates an amendment gain G that is equal to 1.25 (Step S16).

Finally, if the level of the input pixel signal is Vt and Vt is not higher than ($1/4 \times Vm$) (Step S113), the amendment gain generating section 45 generates an amendment gain G that is equal to 1.00 (Step S17).

As described above, if the level of the input video signal is high, the amendment gain generating section 45 varies the amendment gain G so as to decrease the amended error value that is to be subtracted from the video signal. This operation of varying the amendment gain G is devised by taking the characteristic feature of the variance in the gain of the column amplifier increases as a function of the level of the input video signal into consideration.

As described above, the first vertical stripe noise elimination processing section 30 computes the error value that is the difference from the black level for each column amplifier and amends the error value as a function of the level of the input pixel signal. Therefore, the stored error value is not dependent on the signal level. Then, the first vertical stripe noise elimination processing section 30 subtracts the amended error value from the video signal to eliminate the vertical stripe noise.

Since the first vertical stripe noise elimination processing section 30 is devised to operate in the above-described manner, it can reliably eliminate the vertical stripe noise if it shows a variance depending on the level of the video signal.

While the C-MOS image sensor 12 is shielded from light and the error value is computed from the black level for the first vertical stripe noise elimination processing section 30, it may alternatively be so arranged that the photodetector 21A of each unit pixel 21 of the C-MOS image sensor 12 irradiates light at an arbitrarily selected rate (a constant rate) that operates as reference rate and the error value is computed from the arbitrarily selected reference rate.

Second Vertical Stripe Noise Elimination Processing Section

Now, the second vertical stripe noise elimination processing section will be described below. In the following description of the second vertical stripe noise elimination processing section and also in the related drawings, the components same as those of the first vertical stripe noise elimination processing section 30 are denoted respectively by the same reference symbols and will not be described any further.

Figure 8:
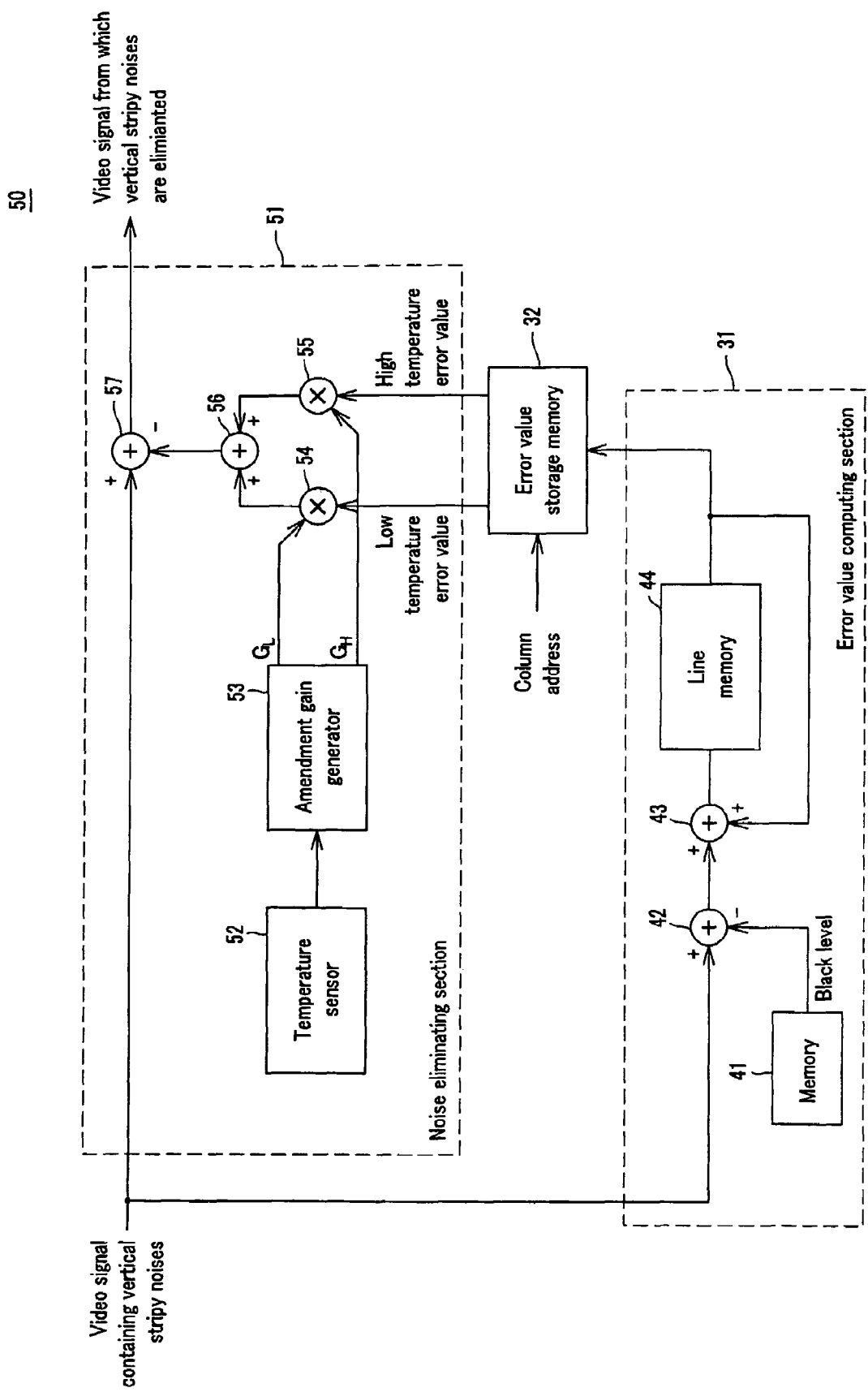
FIG. 8 is a schematic block diagram of a second vertical stripe noise elimination processing section.

FIG. 8 is a schematic block diagram of the second vertical stripe noise elimination processing section 50.

As shown in FIG. 8, the second vertical stripe noise elimination processing section 50 includes an error value computing section 31, an error value storage memory 32 and a noise eliminating section 51.

The error value computing section 31 has an internal configuration same as that of the first vertical stripe noise elimination processing section 30. However, the second vertical stripe noise elimination processing section 50 is adapted to conduct an error value detecting process twice when the temperature of the C-MOS image sensor 12 is low and when the temperature of the C-MOS image sensor 12 is high, using the error value computing section 31.

The error value storage memory 32 stores the error value detected when the temperature is low (low temperature error value) for each column and the error value detected when the temperature is high (high temperature error value) for each column. The error value storage memory 32 stores the low temperature error value and the high temperature error value at a corresponding column address so that the two error values can be read out by externally specifying the column address.

The noise eliminating section 51 conducts an error elimination process for eliminating vertical stripe noises from the video signals obtained by an image pickup operation during the ongoing image pickup operation of the video camera 10, using the error value stored in the error value storage memory 32.

As shown in FIG. 8, the noise eliminating section 51 has a temperature sensor 52 for detecting the temperature of the C-MOS image sensor 12, an amendment gain generating section 53 for generating a low temperature amendment gain $G_L$ and a high temperature amendment gain $G_H$ as a function of the temperature detected by the temperature sensor 52, a first multiplier 54 for multiplying the low temperature error value read out from the error value storage memory 32 by the low temperature amendment gain $G_L$, a second multiplier 55 for multiplying the high temperature error value read out from the error value storage memory 32 by the high temperature amendment gain $G_H$, an adder 56 for adding the output value of the first multiplier 54 and the output value of the second multiplier 55 and a subtracter 57 for subtracting the amended error value output from the adder 56 from the input video signal.

The noise eliminating section 51 having the above-described configuration executes an error elimination process during the ongoing image pickup operation of the video camera 10.

As the video camera 10 is operating to pick up an image, the video signals of the picked up image are input to the noise eliminating section 51.

The video signals are input to the subtracter 47 on a pixel by pixel basis.

As the column address of the pixel of a pixel signal input to the subtracter 57 is input to the error value storage memory 32, the memory 32 outputs the two error values (low temperature error value, high temperature error value) that correspond to the input column address. The low temperature error value output from the error value storage memory 32 is then input to the first multiplier 54, whereas the high temperature error value output from the error value storage memory 32 is input to the second multiplier 55.

The temperatures detected by the temperature sensor 52 are input to the amendment gain generating section 53. The amendment gain generating section 53 generates two amendment gains (low temperature amendment gain $G_L$ and high temperature amendment gain $G_H$) that correspond respectively to the input temperatures.

The low temperature error value output from the error value storage memory 32 is multiplied by the low temperature amendment gain $G_L$ by the first multiplier 54, whereas the high temperature error value output from the error value storage memory 32 is multiplied by the high temperature amendment gain $G_H$ by the second multiplier 55. Then, the two error values that are the products of the multiplications by the respective amendment gains are added by the adder 56 and the sum is supplied to the subtracter 57.

The subtracter 57 then subtracts the error value amended by multiplying the amendment gains G (amended error value) from the input pixel signal.

The video signal from which the vertical stripe noise is eliminated as a result of the above-described process is then output from the subtracter 57.

Note that the low temperature amendment gain $G_L$ and the high temperature amendment gain $G_H$ generated by the amendment gain generating section 53 are used to interpolate the low temperature error value and the high temperature error value and provide a gain for outputting an error value for the temperature of the C-MOS image sensor 12.

Figure 9:
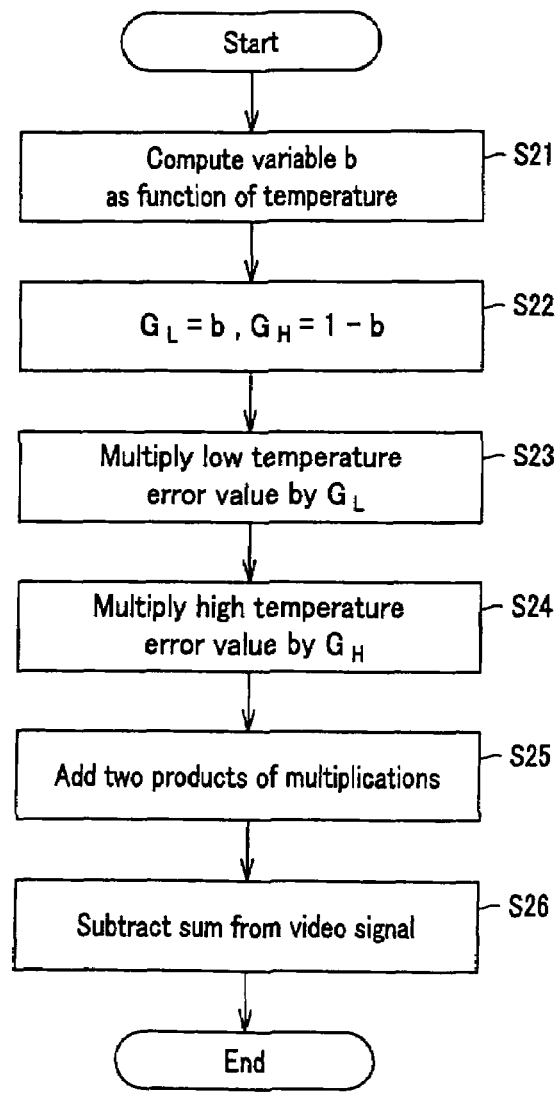
FIG. 9 is a flowchart of the computation of the amendment gain of the second vertical stripe noise elimination processing section.

More specifically, the amendment gain generating section 53 computes the low temperature amendment gain $G_L$ and the high temperature amendment gain $G_H$ by means of an operation as illustrated by the flowchart of FIG. 9.

Referring to FIG. 9, firstly, the amendment gain computing section 53 computes the variable b that varies as a function of the temperature detected by the temperature sensor 52 (Step S21). The variable b is given by a linear function relative to temperature and equal to 0 relative to the temperature when the low temperature error value is detected and equal to 1 relative to the temperature when the high temperature error value is detected.

Subsequently, the amendment gain computing section 53 computes the high temperature amendment gain $G_H=(1-b)$, using the low temperature amendment gain $G_L=b$ (Step S22).

Then, the amendment gain computing section 53 supplies the low temperature amendment gain $G_L$ and the high temperature amendment gain $G_H$ it computed respectively to the first and second multipliers 54, 55.

Thereafter, the low temperature error value is multiplied by the low temperature amendment gain $G_L$ (Step S23) whereas the high temperature error value is multiplied by the high temperature amendment gain $G_H$ (Step S24) and the products of the multiplications are added (Step S25), which is then subtracted from the video signal (Step S26).

As described above, the second vertical stripe noise elimination processing section 50 computes the low temperature error value and the high temperature error value for each column amplifier and interpolates two error values as a function of the temperature of the C-MOS image sensor 12. Therefore, it is possible to generate an error value that is not dependent on a specific temperature.

Since the second vertical stripe noise elimination processing section 50 is devised to operate in the above-described manner, it can reliably eliminates the vertical stripe noise if it shows a variance depending on the temperature.

Third Vertical Stripe Noise Elimination Processing Section

Now, the third vertical stripe noise elimination processing section will be described below. In the following description of the third vertical stripe noise elimination processing section and also in the related drawings, the components same as those of the first vertical stripe noise elimination processing section 30 are denoted respectively by the same reference symbols and will not be described any further.

Figure 10:
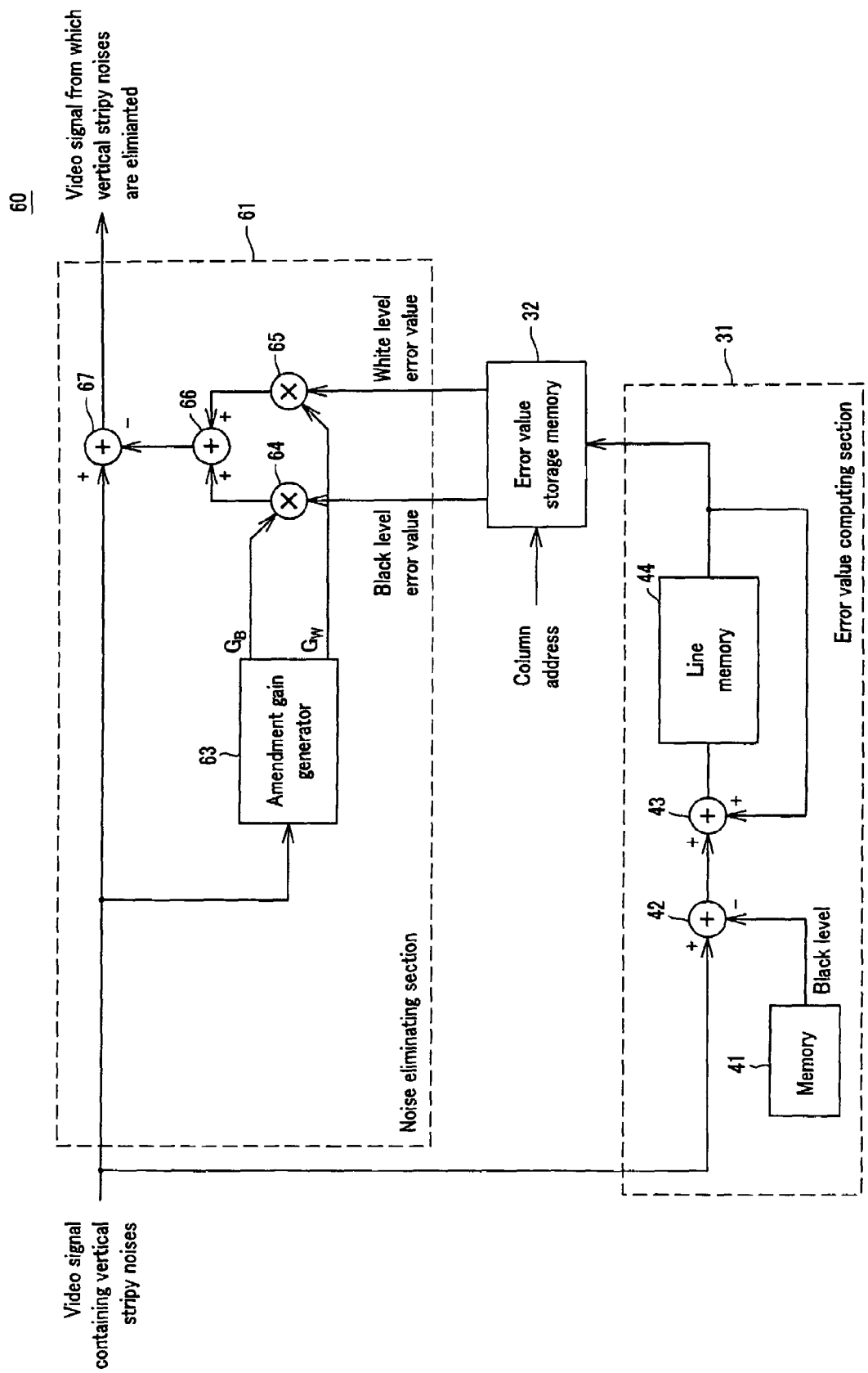
FIG. 10 is a schematic block diagram of a third vertical stripe noise elimination processing section.

FIG. 10 is a schematic block diagram of the third stripe noise elimination processing section 60.

As shown in FIG. 10, the third vertical stripe noise elimination processing section 60 includes an error value computing section 31, an error value storage memory 32 and a noise eliminating section 61.

The error value computing section 31 has an internal configuration same as that of the first vertical stripe noise elimination processing section 30. However, the third vertical stripe noise elimination processing section 60 is adapted to conduct two processes including a process of shielding the C-MOS image sensor 12 from light and computing the error value from the black level and a process of irradiating the C-MOS image sensor 12 at a predetermined irradiation rate and computing the error value from an arbitrarily selected reference level for the error value detection process using the error value computing section 31.

The error value storage memory 32 stores the error value for each column detected by referring to the black level (black level error value) and the error value for each column detected by referring to the arbitrarily selected reference level (reference level error value). The error value storage memory 32 stores the black level error value and the reference level error value at a corresponding column address so that the two error values can be read out by externally specifying the column address.

The noise eliminating section 61 conducts an error elimination process for eliminating vertical stripe noises from the video signals obtained by an image pickup operation during the ongoing image pickup operation of the video camera 10, using the error value stored in the error value storage memory 32.

As shown in FIG. 10, the noise eliminating section 61 has an amendment gain generating section 63 for generating a black level amendment gain $G_B$ and a reference level amendment gain $G_W$ as a function of the level of each video signal, a first multiplier 64 for multiplying the black level error value read out from the error value storage memory 32 by black level amendment gain $G_B$, a second multiplier 65 for multiplying the reference level error value read out from the error value storage memory 32 by the reference value amendment gain $G_W$, an adder 66 for adding the output value of the first multiplier 64 and the output value of the second multiplier 65 and a subtracter 67 for subtracting the amended error value output from the adder 66 from the input video signal.

The noise eliminating section 61 having the above described configuration executes an error elimination process during the ongoing image pickup operation of the video camera 10.

As the video camera 10 is operating to pick up an image, the video signals of the picked up image are input to the noise eliminating section 61.

The video signals are input to the subtracter 67 on a pixel by pixel basis.

As the column address of the pixel of a pixel signal input to the subtracter 67 is input to the error value storage memory 32, the error value storage memory 32 outputs the two error values (black level error value, reference level error value) that correspond to the input column address. The black level error value output from the error value storage memory 32 is then input to the first multiplier 64, whereas the reference level error value output from the error value storage memory 32 is input to the second multiplier 65.

The pixel signal input to the subtracter 67 is also input to the amendment gain generating section 63 at the same time.

The amendment gain generating section 63 generates two amendment gains (black level amendment gain $G_B$ and reference level amendment gain $G_W$) that correspond to the level of the input pixel signal.

The black level error value output from the error value storage memory 32 is multiplied by the black level amendment gain $G_B$ by the first multiplier 64, whereas the reference level error value output from the error value storage memory 32 is multiplied by the reference level amendment gain $G_W$ by the second multiplier 65. Then, the two error values that are the products of the multiplications by the respective amendment gains are added by the adder 66 and the sum is supplied to the subtracter 67.

The subtracter 67 then subtracts the error value amended by multiplying the amendment gains (amended error value) from the input pixel signal.

The video signal from which the vertical stripe noise is eliminated as a result of the above described process is then output from the subtracter 67.

Note that the black level amendment gain $G_B$ and the reference level amendment gain $G_W$ generated by the amendment gain generating section 63 are used to interpolate the black level error value and the reference level error value and provide a gain for outputting an error value for the level of the input video signal.

Figure 11:
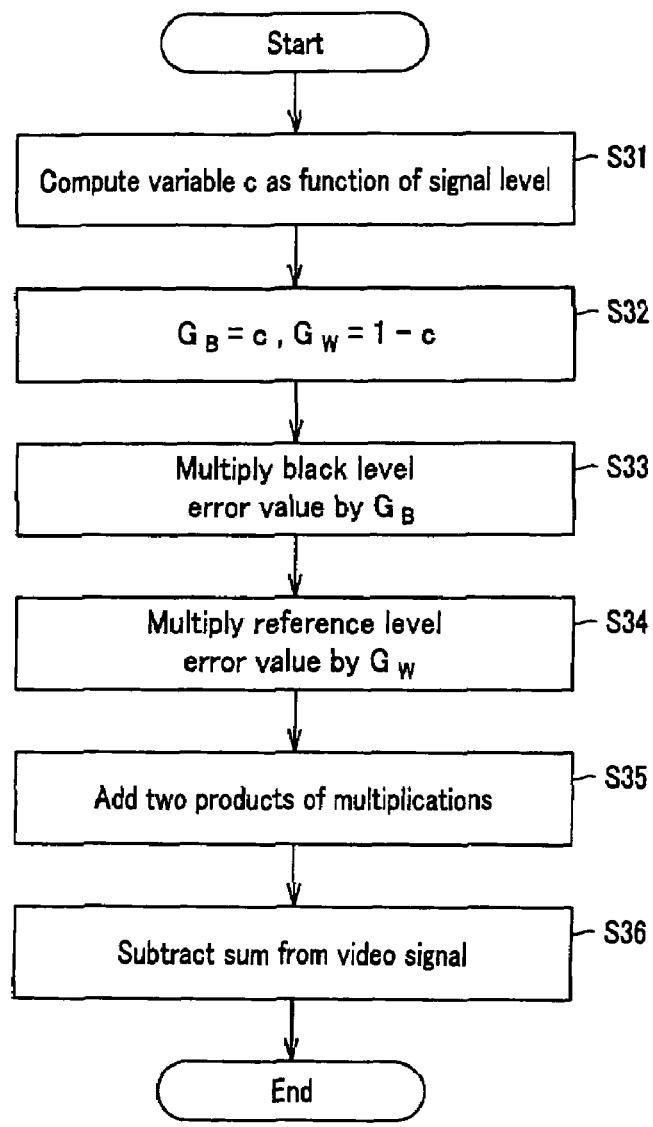
FIG. 11 is a flowchart of the computation of the amendment gain of the third vertical stripe noise elimination processing section.

More specifically, the amendment gain generating section 63 computes the black level amendment gain $G_B$ and the reference level amendment gain $G_W$ by means of an operation as illustrated by the flowchart of FIG. 11.

Referring to FIG. 11, firstly, the amendment gain computing section 53 computes the variable c that varies as a function of the level of the input signal (Step S31). The variable c is given by a linear function relative to the signal level and equal to 0 relative to the black level and equal to 1 relative to the reference level.

Subsequently, the amendment gain computing section 53 computes the reference level amendment gain $G_W=(1-c)$, using the black level amendment gain $G_B=c$ (Step S32).

Then, the amendment gain computing section 53 supplies the black level amendment gain $G_B$ and the reference level amendment gain $G_W$ it computed respectively to the first and second multipliers 64, 65.

Thereafter, the black level error value is multiplied by the black level amendment gain $G_B$ (Step S33) whereas the reference level error value is multiplied by the reference level amendment gain $G_W$ (Step S34) and the products of the multiplications are added (Step S35), which is then subtracted from the video signal (Step S36).

As described above, the third vertical stripe noise elimination processing section 60 computes the black level error value and the arbitrarily selected reference level error value for each column amplifier and interpolates two error values according to the level of the video signals. Therefore, it is possible to generate an error value that is not dependent on a specific signal level.

Since the third vertical stripe noise elimination processing section 60 is devised to operate in the above described manner, it can reliably eliminate the vertical stripe noise if it shows a variance depending on the signal level.

Fourth Vertical Stripe Noise Elimination Processing Section

Now, the fourth vertical stripe noise elimination processing section will be described below. In the following description of the fourth vertical stripe noise elimination processing section and also in the related drawings, the components same as those of the first vertical stripe noise elimination processing section 30 are denoted respectively by the same reference symbols and will not be described any further.

Figure 12:
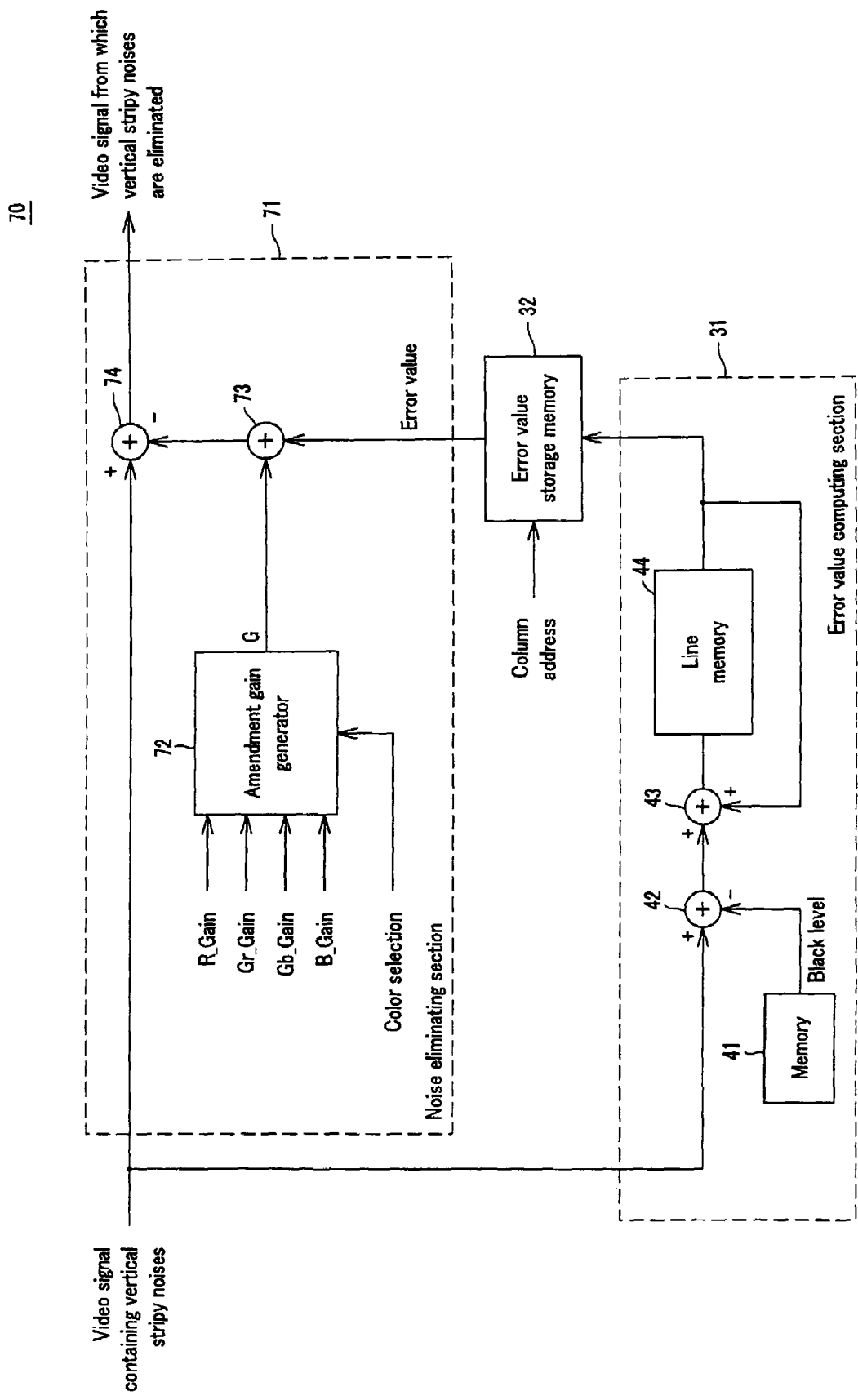
FIG. 12 is a schematic block diagram of a fourth vertical stripe noise elimination processing section.

FIG. 12 is a schematic block diagram of the fourth stripe noise elimination processing section 70.

As shown in FIG. 12, the fourth vertical stripe noise elimination processing section 70 includes an error value computing section 31, an error value storage memory 32 and a noise eliminating section 71.

The error value computing section 31 has an internal configuration same as that of the first vertical stripe noise elimination processing section 30.

The error value storage memory 32 stores the error value for each column detected by referring to the black level. The error value storage memory 32 stores the error value at a corresponding column address so that the error value can be read out by externally specifying the column address.

The noise eliminating section 71 conducts an error elimination process for eliminating vertical stripe noises from the video signals obtained by an image pickup operation during the ongoing image pickup operation of the video camera 10, using the error values stored in the error value storage memory 32.

As shown in FIG. 12, the noise eliminating section 71 has an amendment gain generating section 72 for generating an amendment gain G that corresponds to the color component of each pixel, a multiplier 73 for multiplying the error value read out from the error value storage memory 32 by the amendment gain G and a subtracter 74 for subtracting the amended error value output from the multiplier 73 from the video signal input to it.

The noise eliminating section 71 having the above described configuration executes an error elimination process during an ongoing image pickup operation of the video camera 10.

As the video camera is operating to pick up an image, the video signals of the picked up image are input to the noise eliminating section 71.

The video signals are input to the subtracter 74 on a pixel by pixel basis.

As the column address of the pixel of a pixel signal input to the subtracter 74 is input to the error value storage memory 32, the memory 32 outputs the error value that corresponds to the input column address. The error value output from the error value storage memory 32 is then input to the multiplier 73.

Color information on the pixel signal input to the subtracter 74 is also input to the amendment gain generating section 72 at the same time. An amendment gain is registered in the amendment gain generating section 72 for each color component of the pixels. For example, an amendment gain may be registered for each color of the color filters (R, Gr, Gb, B) of the C-MOS image sensor 12. If the C-MOS image sensor 12 uses primary color filters, an amendment gain is registered for each primary color. If, on the other hand, the C-MOS image sensor 12 uses complementary color filters, an amendment gain is registered for each complementary color.

The color information on the pixel signal input to the subtracter 74 is also input to the amendment gain generating section 72 at the same time. Then, the amendment gain generating section 72 selects the gain that corresponds to the color information out of the plurality of registered gains and outputs it as amendment gain G.

The error value output from the error value storage memory 32 is multiplied by the multiplier 73 by the amendment gain G The error value multiplied by the amendment gain is then supplied to the subtracter 74.

The subtracter 74 subtracts the error value (amended error value) that is obtained by multiplying the amendment gain from the input pixel signal.

The video signal from which the vertical stripe noise is eliminated as a result of the above-described process is then output from the subtracter 47.

Figure 13:
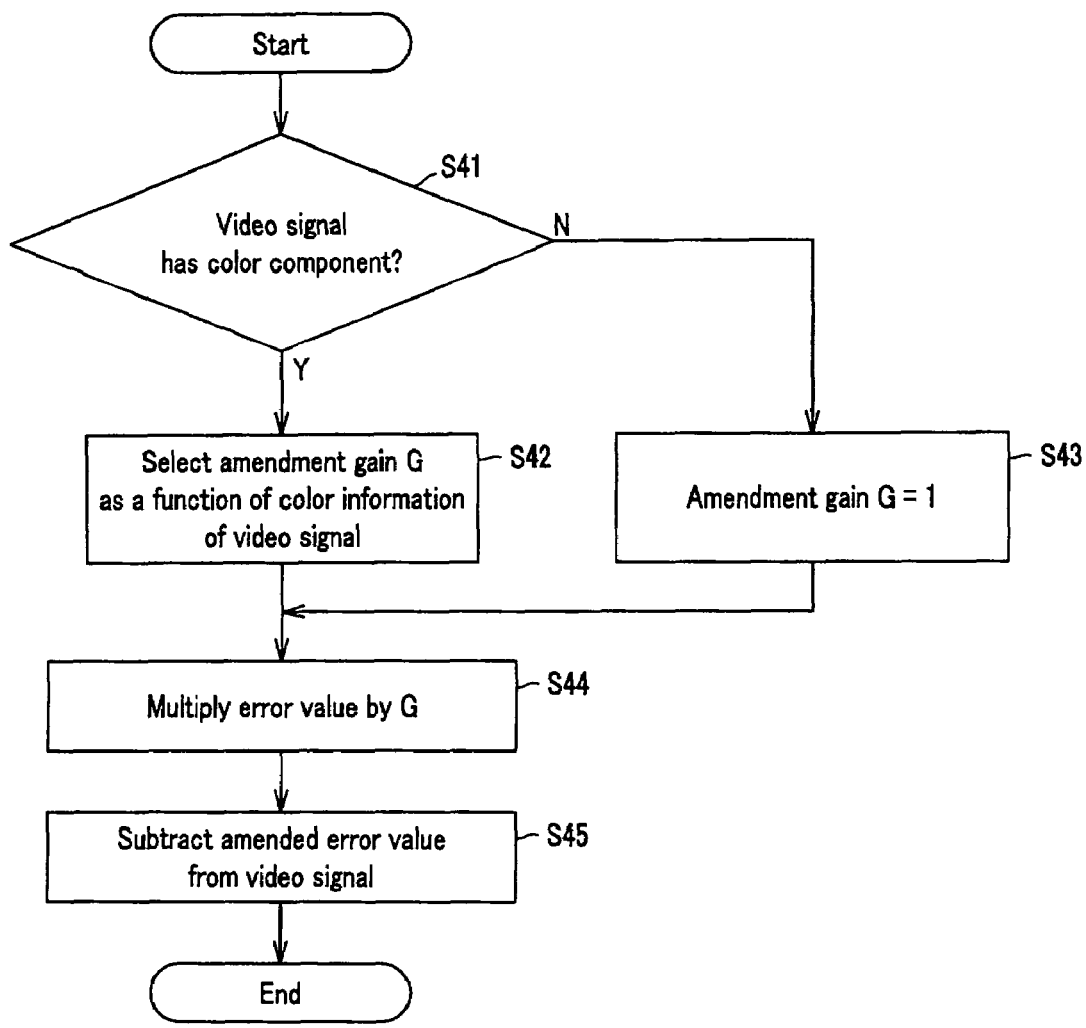
FIG. 13 is a flowchart of the computation of the amendment gain of the fourth vertical stripe noise elimination processing section.

FIG. 13 is a flowchart of the operation of the noise eliminating section 71.

As shown in FIG. 13, the noise eliminating section 71 determines if the input image signal has a color component or not (Step S41). If it has a color component, the noise eliminating section 71 selects an amendment gain G on the basis of the color information (Step S42). If, on the other hand, it does not have a color component, the noise eliminating section 71 selects 1 for the amendment gain G (Step S43).

Then, the noise eliminating section 71 multiplies the error value by the amendment gain G (Step S44) and subtracts the product of the multiplication (amended error value) from the pixel signal (Step S45).

As described above, the fourth vertical stripe noise elimination processing section 70 computes an error value for each column amplifier and amends the error value as a function of the color component of the video signal. Therefore, it is possible to generate an error value that is not dependent on the level difference that is found for each color component.

Since the fourth vertical stripe noise elimination processing section 70 is devised to operate in the above described manner, it can reliably eliminate the vertical stripe noise if it shows a variance depending on the signal level.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus to be used for a solid-state image pickup element having a plurality of output systems adapted to output video signals obtained from pixels arranged in a column direction, the apparatus comprising:
    amendment means for amending an error value of each column in the video signals output from the solid-state image pickup element;
    temperature detection means for detecting a temperature;
    subtraction means for subtracting the error value amended by the amendment means for each column from the video signals output from the solid-state image pickup element; and
    error value computing means for shielding the solid-state image pickup element from light or irradiating light to the solid-state image pickup element at a constant rate, for computing a respective average value of each of a plurality of pixel signals obtained from the pixels in a predetermined region of the solid-state image pickup element, for subtracting the respective average value from a respective of the plurality of pixel signals obtained from the pixels of the solid-state image pickup element, and for accumulating values obtained by subtractions for respective columns, wherein
    the amendment means amends the error value corresponding to a column position of the video signals output from the solid-state image pickup element according to the temperature detected by the temperature detection means to produce an amended error value and supplies the amended error value to the subtraction means.

2. The apparatus according to claim 1, wherein the amendment means modifies an error value computed for a low temperature and an error value computed for a high temperature as a function of the temperature detected by the temperature detection means, to produce a modified low temperature error value and a modified high temperature error value, respectively, synthesizes the modified low temperature error value and the modified high temperature error value to produce a synthesized error value, and supplies the synthesized error value to the subtraction means as a corrected error value.

3. The apparatus according to claim 1, wherein,
    the solid-state image pickup element has:
        a plurality of unit pixels arranged in a matrix, each having at least a photodetector and a MOS switch;
        a plurality of column signal lines provided for respective column groups of the plurality of unit pixels, the unit pixels of each of the column groups being arranged in the column direction, the plurality of column signal lines being adapted to transmit a respective detection signal detected by each photodetector;
        a plurality of horizontal selection lines arranged for respective row groups of the plurality of unit pixels, the unit pixels of each of the row groups being arranged in a row direction, the plurality of horizontal selection lines being adapted to control the MOS switches to select one of a plurality of unit pixels for reading out the respective detection signal detected by the photoconductor of the one of the plurality of unit pixels; and
        a plurality of column amplifiers adapted to amplify the detection signals transmitted by the plurality of column signal lines, and
    the video signals are output as the plurality of unit pixels arranged in the matrix are sequentially selected.

4. A signal processing method of processing video signals output from a solid-state image pickup element having a plurality of output systems adapted to output video signals obtained from pixels arranged in a column direction, the method comprising:
    shielding the solid-state image pickup element from light or irradiating light to the solid-state image pickup element at a constant rate;
    computing a respective average value of each of a plurality of pixel signals obtained from the pixels in a predetermined region of the solid-state image pickup element;
    subtracting the respective average value from a respective of the plurality of pixel signals obtained from the pixels of the solid-state image pickup element;
    accumulating values obtained by the subtracting for respective columns;
    reserving the values as error values of the respective columns;
    detecting a temperature;
    amending one of the error values corresponding to a column position of the video signals output from the solid-state image pickup element according to the temperature; and
    subtracting the one of the error values from the video signals output from the solid-state image pickup element.

5. The method according to claim 4, further comprising:
    transmitting a respective detection signal detected by a respective photodetector included in each of a plurality of unit pixels with a plurality of column signal lines provided for respective column groups of the plurality of unit pixels, the unit pixels of each of the column groups being arranged in the column direction;
    reading out the respective detection signal by controlling a respective MOS switch included in each of the plurality of unit pixels to select a respective of the plurality of unit pixels with a plurality of horizontal selection lines arranged for respective row groups of the plurality of unit pixels, the unit pixels of each of the row groups being arranged in a row direction; and amplifying the respective detection signal transmitted by a respective of the plurality of column signal lines with a respective of a plurality of column amplifiers, wherein the video signals are output as the plurality of unit pixels, which are arranged in a matrix, are sequentially selected.

6. An image pickup apparatus, comprising:

a solid-state image pickup element having a plurality of output systems adapted to output video signals obtained from pixels arranged in a column direction;

temperature detection means for detecting a temperature;

amendment means for amending an error value of each column in the video signals output from the solid-state image pickup element;

subtraction means for subtracting the error value amended by the amendment means for each column from the video signals output from the solid-state image pickup element;

recording or display means for recording on a recording medium or displaying on a display apparatus video signals obtained by subtracting the error value by the subtracting means; and an error value computing section adapted to shield the solid-state image pickup element from light or irradiate light to the solid-state image pickup element at a constant rate, to compute a respective average value of each of a plurality of pixel signals obtained from the pixels in a predetermined region of the solid-state image pickup element, to subtract the average value from a respective of the plurality of pixel signals obtained from the pixels of the solid-state image pickup element, and to accumulate values obtained by subtractions for respective columns, wherein the amendment means are further adapted to amend the error value corresponding to a column position of the video signals output from the solid-state image pickup element according to the temperature detected by the temperature detection means to produce an amended error value and to supply the amended error value to the subtraction means.

7. The apparatus according to claim 6, wherein, the solid-state image pickup element has:

a plurality of unit pixels arranged in a matrix, each having at least a photodetector and a MOS switch;

a plurality of column signal lines provided for respective column groups of the plurality of unit pixels, the unit pixels of each of the column groups being arranged in the column direction, the plurality of column signal lines being adapted to transmit a respective detection signal detected by each photodetector;

a plurality of horizontal selection lines arranged for respective row groups of the plurality of unit pixels, the unit pixels of each of the row groups being arranged in a row direction, the plurality of horizontal selection lines being adapted to control the MOS switches to select one of the plurality of unit pixels for reading out the respective detection signal detected by the photoconductor of the one of the plurality of unit pixels; and a plurality of column amplifiers adapted to amplify the detection signals transmitted by the plurality of column signal lines, and the video signals are output as the plurality of unit pixels arranged in the matrix are sequentially selected.

8. A signal processing apparatus to be used for a solid-state image pickup element having a plurality of output systems adapted to output video signals obtained from pixels arranged in a column direction, the apparatus comprising:

an amendment unit adapted to amend an error value of each column in the video signals output from the solid-state image pickup element;

a temperature detection unit adapted to detect a temperature;

a subtraction unit adapted to subtract the error value amended by the amendment unit for each column from the video signals output from the solid-state image pickup element; and an error value computing unit adapted to shield the solid-state image pickup element from light or irradiate light to the solid-state image pickup element at a constant rate, to compute a respective average value of each of a plurality of pixel signals obtained from the pixels in a predetermined region of the solid-state image pickup element, to subtract the respective average value from a respective of the plurality of pixel signals obtained from the pixels of the solid-state image pickup element, and to accumulate values obtained by subtractions for respective columns, wherein the amendment unit is adapted to amend the error value corresponding to a column position of the video signals output from the solid-state image pickup element according to the temperature detected by the temperature detection unit to produce amended error value and to supply the amended error value to the subtraction unit.

9. An image pickup apparatus, comprising:

a solid-state image pickup element having a plurality of output systems adapted to output video signals obtained from pixels arranged in a column direction;

a temperature detection unit adapted to detect a temperature;

an amendment unit adapted to amend an error value of each column in the video signals output from the solid-state image pickup element;

a subtraction unit adapted to subtract the error value amended by the amendment unit for each column from the video signals output from the solid-state image pickup element;

a recording or display unit adapted to record on a recording medium or display on a display apparatus the video signals obtained by subtracting the error value by the subtracting unit; and an error value computing section adapted to shield the solid-state image pickup element from light or irradiate light to the solid-state image pickup element at a constant rate, to compute a respective average value of each of a plurality of pixel signals obtained from the pixels in a predetermined region of the solid-state image pickup element, to subtract the respective average value from a respective of the plurality of pixel signals obtained from the pixels of the solid-state image pickup element, and to accumulate values obtained by subtractions for respective columns, wherein the amendment unit is adapted to amend the error value corresponding to a column position of the video signals output from the solid-state image pickup element according to the temperature detected by the temperature detection unit to produce an amended error value and to supply the amended error value to the subtraction unit.

* * * * *